(12) United States Patent
Stremple

(10) Patent No.: US 6,406,153 B1
(45) Date of Patent: Jun. 18, 2002

(54) SPECTRAL DISPERSION DEVICE

(76) Inventor: Paul R. Stremple, 135 Plymouth St., #306, Brooklyn, NY (US) 11201

( * ) Notice: Subject to any disclaimer, the term of this patent is extended or adjusted under 35 U.S.C. 154(b) by 0 days.

(21) Appl. No.: 09/710,381

(22) Filed: Nov. 10, 2000

(51) Int. Cl.[7] ................................................. G02B 5/04
(52) U.S. Cl. ...................... 359/615; 359/201; 359/211
(58) Field of Search ............................... 359/615, 209, 359/211, 720, 722, 558, 831, 837, 839

(56) References Cited

U.S. PATENT DOCUMENTS

| | | | | |
|---|---|---|---|---|
| 3,528,261 A | * | 9/1970 | Jones | 350/615 |
| 3,665,729 A | * | 5/1972 | Elbe | 63/32 |
| 5,661,586 A | * | 8/1997 | Harig | 359/203 |
| 5,682,262 A | * | 10/1997 | Wefers et al. | 359/305 |
| 5,859,702 A | * | 1/1999 | Lindblom | 356/305 |
| 6,138,082 A | * | 10/2000 | Wang et al. | 702/109 |
| 6,251,166 B1 | * | 11/2000 | Matsushita et al. | 359/566 |

* cited by examiner

*Primary Examiner*—Mohammad Sikder
(74) *Attorney, Agent, or Firm*—Brij K. Agarwal; Eckert Seamans Cherin & Mellott, LLC

(57) ABSTRACT

A spectral dispersion device includes a transmission member formed of a translucent material and formed with an image surface, a reflection surface, and a dispersion surface. The image surface includes an image that receives a ray of visible light therethrough and into the interior of the transmission member, with the ray of light being reflected off the reflection surface within the interior of the transmission member and being dispersed through the dispersion surface to display a light pattern in the form of a spectrally-dispersed representation of the image. The light pattern is visible from the exterior of the transmission member by an observer and varies according to the position of the observer with respect to the dispersion surface. The light-dispersive properties of the transmission member can be varied by altering the configuration of the transmission member and the material out of which it is made, as well as by varying the wavelengths of the ray of light and the light-absorbing properties and other properties of the transmission member. The abstract shall not be used for interpreting the scope of the claims.

42 Claims, 5 Drawing Sheets

(1 of 5 Drawing Sheet(s) Filed in Color)

SPECTRAL DISPERSION DEVICE

BACKGROUND OF THE INVENTION

1. Field of the Invention

The present invention relates generally to devices that aesthetically disperse visible light and, more particularly, to a device that displays a light pattern in the form of a spectrally-dispersed representation of an image.

2. Description of the Related Art

As is understood in the relevant art, the index of refraction for a given material is different for differing wavelengths of light. The aforementioned variation in the index of refraction causes the spectral dispersion that results from directing a multi-wavelength beam of visible light through a prism. A similar spectral dispersion process causes an aesthetically pleasing rainbow to naturally occur when a ray of sunlight passes through falling rain.

It is known that stained glass can be employed to transmit variously colored images therethrough with the use of colored or painted glass. The color patterns of such stained glass do not vary and do not employ reflection, refraction, or dispersion. As such, while stained glass possesses some aesthetic qualities, such aesthetic qualities are limited.

It is thus desired to provide a device that employs light dispersion to produce spectrally-dispersed images of visible light. It is also preferred that such a device be provided that displays spectrally-dispersed images that vary according to the perspective of the observer to the device.

SUMMARY OF THE INVENTION

In view of the foregoing, a spectral dispersion device includes a transmission member formed of a translucent material and formed with an image surface, a reflection surface, and a dispersion surface. The image surface includes an image that receives a ray of visible light therethrough and into the interior of the transmission member, with the ray of light being reflected off the reflection surface within the interior of the transmission member and being dispersed through the dispersion surface to display a light pattern in the form of a spectrally-dispersed representation of the image. The light pattern is visible from the exterior of the transmission member by an observer and varies according to the position of the observer with respect to the dispersion surface. The light-dispersive properties of the transmission member can be varied by altering the configuration of the transmission member and the material out of which it is made, as well as by varying the wavelengths of the ray of light and the light-absorbing properties and other properties of the transmission member.

An objective of the present invention is to provide a spectral dispersion device that produces a light pattern in the form of a spectrally-dispersed representation of an image.

Another objective of the present invention is to provide a spectral dispersion device that displays a light pattern that is variable according to the position of an observer with respect to the device.

Another objective of the present invention is to provide a spectral dispersion device that is itself aesthetically pleasing to an observer and that produces an aesthetically pleasing spectrally-dispersed light pattern that is visible from the exterior of the device.

Another objective of the present invention is to provide a spectral dispersion device that is simple in construction and operation.

Another objective of the present device is to provide a spectral dispersion device that can be manufactured in different configurations to provide correspondingly different light images.

An aspect of the present invention is to provide a spectral dispersion device, the general nature of which can be stated as including a transmission member having an interior and an exterior, an image surface, a reflection surface, and a dispersion surface, with the interior being translucent to a ray of light having at least two different wavelengths. The image surface includes an image, the reflection surface is oriented at a reflection angle with respect to the image surface, and the dispersion surface is oriented at a dispersion angle with respect to the image surface. The transmission member is structured to receive the ray of light through the image surface and allow it to pass into the interior of the transmission member, reflect the ray of light off the reflection surface within the interior, and disperse the ray of light through the dispersion surface from the interior of the transmission member to the exterior thereof to display a light pattern in the form of a spectrally-dispersed representation of the image that is visible from the exterior.

BRIEF DESCRIPTION OF THE DRAWINGS

The file of this patent contains at least one drawing executed in color. Copies of this patent with the color drawing(s) will be provided by the Patent and Trademark Office upon request and payment of the necessary fee.

A further understanding of the invention can be gained from the following description of the preferred embodiments when read in conjunction with the accompanying drawings in which.

Similar numerals refer to similar parts throughout the specification.

DESCRIPTION OF THE PREFERRED EMBODIMENTS

Figure 1:
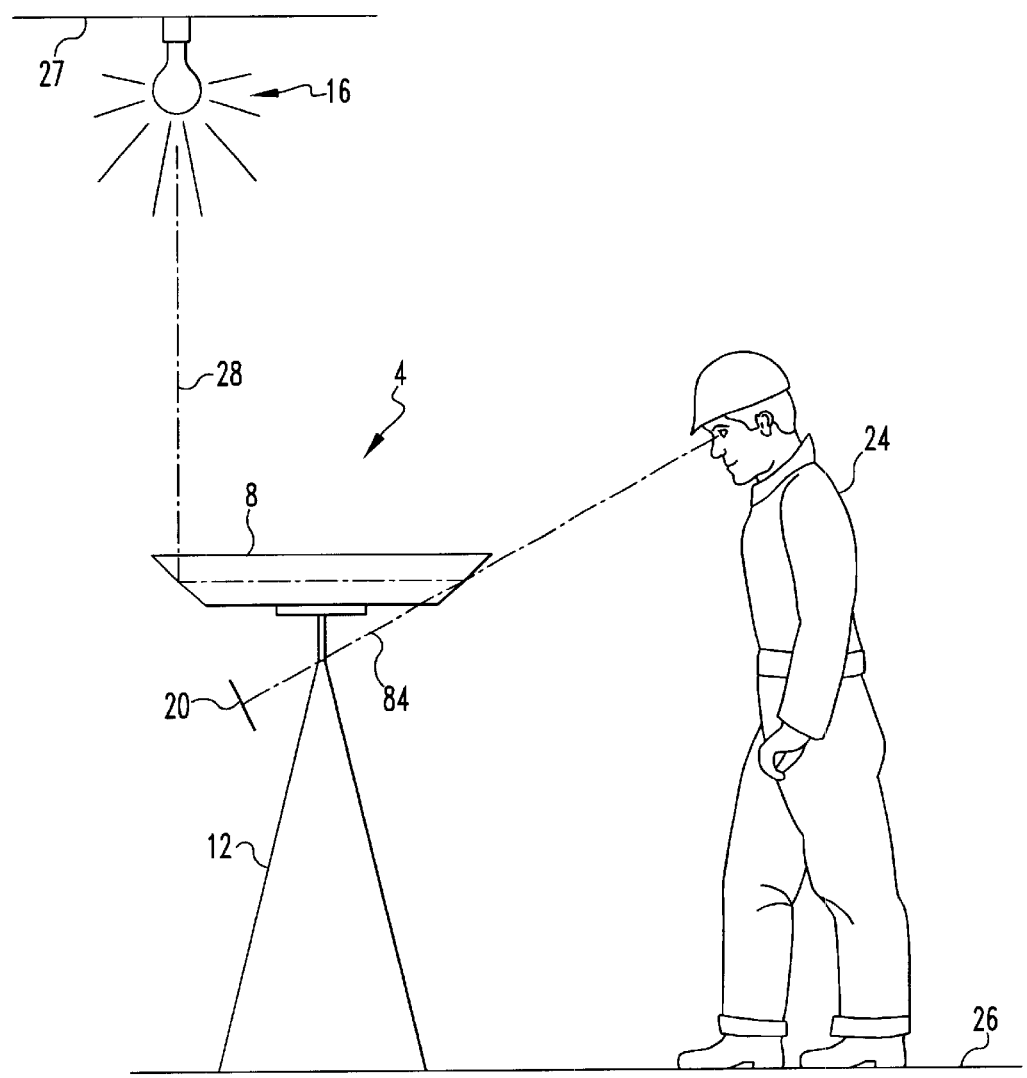
FIG. 1 is an elevational view of a spectral dispersion device in accordance with the present invention in a setting where an observer views a light pattern emanating from the present invention.

A spectral dispersion device 4 in accordance with the present invention is indicated generally in FIGS. 1 and 3–5. FIG. 1 depicts the spectral dispersion device 4 in a beneficial setting such as a gallery environment, although it will be understood from the following that the spectral dispersion device 4 can be beneficially employed in numerous other settings without departing from the concept of the present invention.

As can be seen in FIG. 1, the spectral dispersion device 4 includes a transmission member 8 that is mounted to a display stand 12 and that cooperates with a light source 16 to produce an aesthetically pleasing light pattern 20 (depicted schematically in FIG. 1) that can be viewed by an observer 24. The light pattern 20 is displayed in the form of an optical illusion 25, as will be set forth more fully below.

The display stand 12 is disposed on a floor 26 and supports the transmission member 8 a given distance above the floor 26, although it is understood that the display stand can be of other configurations such as cables (not shown) extending downwardly from a ceiling 27, or may include other structures extending from walls (not shown) as well as other supporting devices without departing from the concept on the present invention. The given distance at which the transmission member 8 is supported above the floor 26 is preferably set such that the observer 24 standing or otherwise disposed on the floor 26 can comfortably view the light pattern 20 emanating from the transmission member 8, and is additionally set according to aesthetic criteria.

Figure 2:
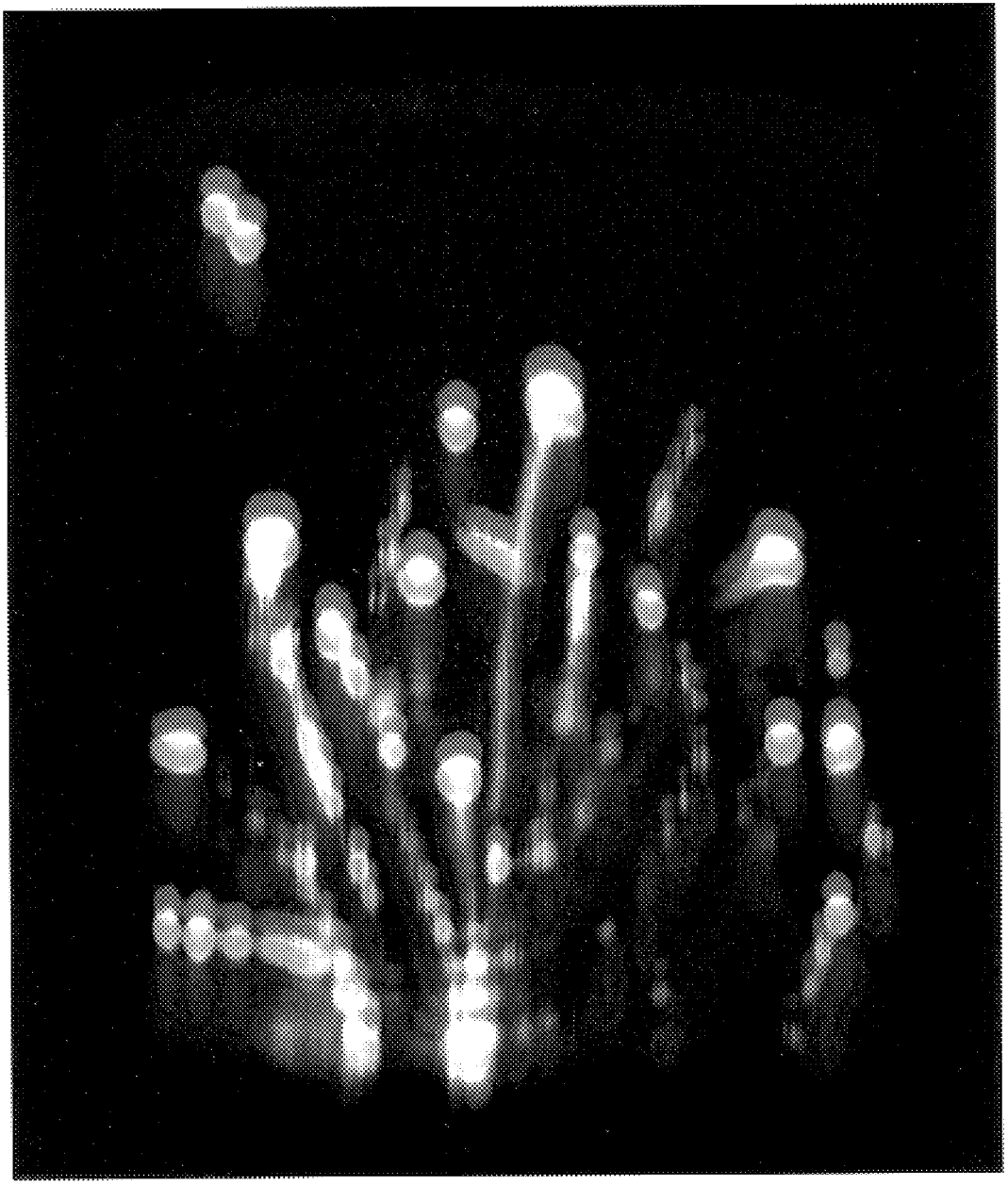
FIG. 2 is a color photograph of an example of the light pattern emanating from the present invention.

The light pattern 20, an example of which is depicted generally in FIG. 2, is produced by the dispersion of a ray of light 28 by the transmission member 8. The transmission member 8 is thus formed out of a primary material that is translucent to at least two wavelengths of visible light, such as glass, quartz, polycarbonate, and numerous other such materials. As used herein, the term "translucent" refers to the ability of at least the primary material to transmit electromagnetic radiation in the form of visible light. As will be set forth more fully below, the configuration of the transmission member 8, as well as the primary material out of which the transmission member 8 is manufactured, can be varied according to the desired aesthetic appearance of the light pattern 20, the desired aesthetic appearance of the spectral dispersion device 4 as a whole, as well as other aesthetic and functional factors.

Figure 3:
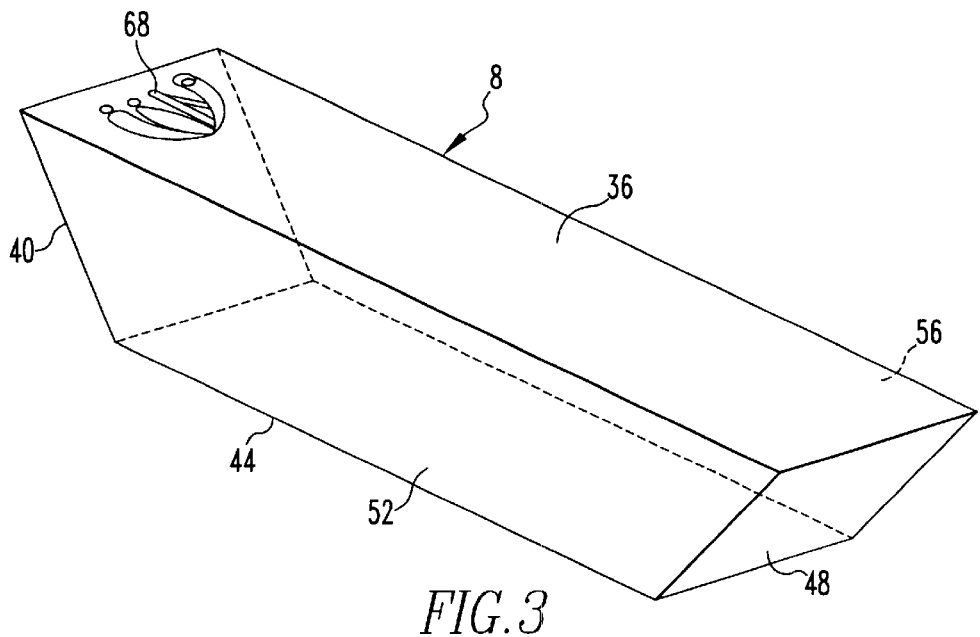
FIG. 3 is a perspective view of a transmission member of the present invention.
Figure 4:
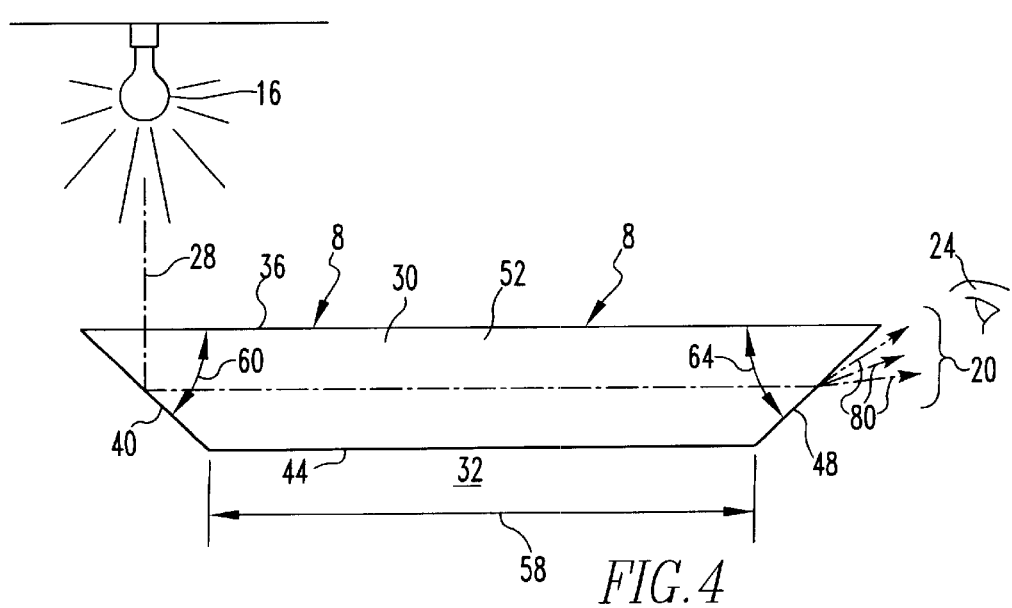
FIG. 4 is a side elevational view of the transmission member schematically depicting a ray of light that is dispersed to form the light pattern.

With more particular attention to FIGS. 3 and 4, the transmission member 8 is a solid block of a primary material and includes an interior 30 within the transmission member 8 and an exterior 32 which is outside the interior 30. While the transmission member 8 is depicted herein as being a monolithic, single-piece member, it is understood that multi-piece configurations of the transmission member 8 are possible depending upon the desired aesthetic appearance of the light pattern 20 as well as that of the spectral dispersion device 4 itself.

The transmission member 8 includes an image surface 36, a reflection surface 40, a connection surface 44, and a dispersion surface 48 connected with one another such that the transmission member 8 is of a roughly trapezoidal cross section from the perspective of a plane extending through the transmission member 8 in a direction parallel with the page of FIG. 4. As will be set forth more fully below, however, the transmission member 8 can be of other non-trapezoidal configurations depending upon various aesthetic and functional considerations. As can be seen in FIG. 3, the image surface 36, the reflection surface 40, the connection surface 44, and the dispersion surface 48 terminate at opposite end surfaces 52 and 56.

The image surface 36 and the connection surface 44 are substantially parallel with one another, with the connection surface 44 being of a length 58 as measured from the reflection surface 40 to the dispersion surface 48. It can thus be seen that the connection surface 44 extends between the reflection surface 40 and the dispersion surface 48. Similarly, the image surface 36 of the transmission member 8 depicted in FIGS. 1 and 3–5 extend between the reflection surface 40 and the dispersion surface 48. It is understood, however, that in other embodiments, different arrangements of surfaces of the transmission member 8 can be arranged to achieve different aesthetic effects without departing from the concept of the present invention.

The reflection surface 40 and the dispersion surface 48 are highly polished, substantially planar surfaces formed on the transmission member 8. The reflection surface 40 is oriented at a reflection angle 60 with respect to the image surface 36. The dispersion surface 48 is oriented at a dispersion angle 64 with respect to the image surface 36. In the embodiment of the transmission member 8 depicted in FIGS. 1 and 3–5, the reflection angle 60 is an included angle of substantially 45 degrees, although it is understood that the reflection angle 60 can be greater or lesser than 45 degrees depending upon the configuration of the transmission member 8 and the desired aesthetic effects.

If the primary material of the transmission member 8 is leaded glass having a lead content of approximately 38 percent, it has been determined that the dispersion angle 64 is preferably between about 50 and 60 degrees, and is more preferably about 55 degrees. Since other primary materials such as ordinary glass, quartz, and other such materials have different values for the index of refraction, the dispersion angle 64 will correspondingly vary with the index of refraction and the desired aesthetic result. The dispersion angle 64 is depicted in FIG. 4 as being an included angle, although as will be set forth more fully below, the dispersion angle 64 may be a non-included angle depending upon the desired aesthetic result without departing from the concept of the present invention.

Figure 5:
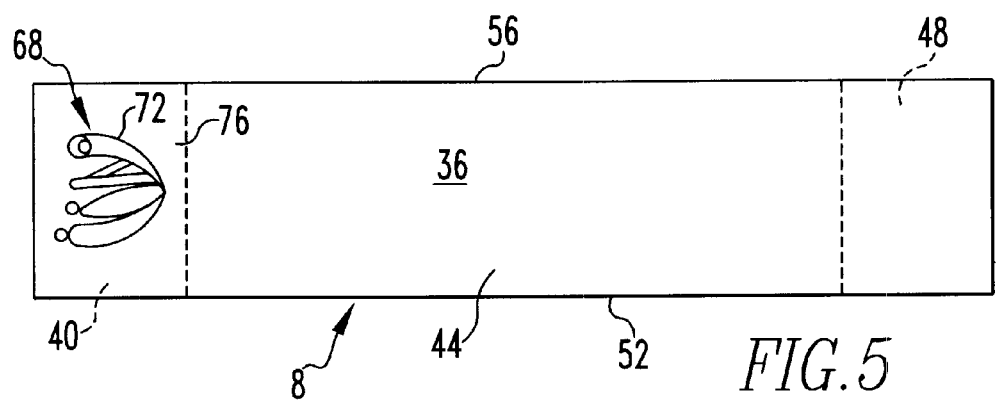
FIG. 5 is a top plan view of the transmission member.

As is best shown in FIGS. 3 and 5, the image surface 36 includes an image 68 thereon. More specifically, the image 68 is defined by an image region 72 and a background region 76 on the image surface 36. In the embodiment depicted in FIGS. 3 and 5, the image 68 is more particularly defined as the differences in the relative surface roughness of the image region 72 and the background region 76. As will be set forth more fully below, the ray of light 28 is desired to be transmitted into the interior 30 of the transmission member 8 to beneficially produce the light pattern 20. Roughened surfaces tend to reflect light away from the interior 30 of the transmission member 8 and thus resist transmission of the light into the transmission member 8, while relatively polished or un-roughened surfaces tend to reflect relatively less light and thus admit more light into the interior 30.

Such variable surface roughness can be imparted to the image surface 36 with any of a variety of mechanisms, such as sand blasting, chemical etching, mechanical abrasion, as well as other known mechanisms. Such roughening of the transmission member 8 will be referred to herein as "etching" regardless of the mechanism by which the roughening of the transmission member 8 was provided.

One method of providing different degrees of etching or roughness between the image region 72 and the background region 76 is to apply one or more etch-resistant coatings to the image surface 36 in a desirable pattern to form the image region 72. Such coatings may include various curable adhesives such as Elmer's Glue All manufactured by Borden Chemical Co. of Columbus, Ohio, USA or formulations of latex glue, as well as other adhesives. In this regard, the image surface 36 is initially highly polished, and the adhesives or other coatings are applied to the highly polished image surface 36 and permitted to cure. The regions of the image surface 36 having the aforementioned coatings applied thereto ultimately form the image region 72 of the image 68.

The image surface 36 is then etched by one of the aforementioned etching mechanisms to etch the background region 76. In so doing, the adhesives applied to the image region 72 resist the etching process, such that when the background region 76 is fully etched the adhesives can be removed from the image region 72 to reveal a highly polished image region 72, which is the portion of the initially highly polished image surface 36 that was protected from the etching process by the adhesives applied thereto.

In this regard, it is understood that numerous methods can be employed to protect the image region 72 from etching during the etching process of the image surface 36. Examples of such methods include the application of adhesive tape, paints, and protection by instruments manually supported above the image region 72, as well as other methods. Additionally, the adhesives or other methodologies employed to protect the image region 72 during the etching process can be beneficially removed in several stages during the etching process such that the image region 72 is partially etched, with the background region 76 being etched to a greater degree than the image region 72. Moreover, the image region 72 can be configured to itself have varying degrees of etching.

An example of an image region 72 and a background region 76 is indicated generally in FIG. 5. It is also understood that the degree of etching of the image region 72 and the background region 76 can be reversed, meaning that if desired for aesthetic or functional reasons, the image region 72 can be more highly etched than the background region 76 without departing from the concept of the present invention. It is further understood that the image 68 can be of numerous forms not formed into the image surface 36, such as decals, paint, and paper, as well as other items applied to or positioned adjacent the image surface 36.

In use, the light source 16 produces the ray of light 28 and transmits it toward the image 68 on the image surface 36. The ray of light 28 is transmitted through the image 68 and is allowed to pass into the interior 30 of the transmission member 8. In this regard, it can be seen that the background region 76 substantially resists the transmission of light therethrough, thus transmitting light substantially only according to the shape of the image region 72.

The ray of light 28 then reflects off the reflection surface 40 and is transmitted through the interior 30 of the transmission member 8 toward the dispersion surface 48. When the ray of light 28 passes through the dispersion surface 48, the ray of light 28 is spectrally dispersed to make visible the light pattern 20, which is a spectrally-dispersed representation of the image 68 and is visible by the observer 24 from the exterior 32 of the transmission member 8. As such, the spectral dispersion device 4 as depicted herein employs the transmission, reflection, and dispersion of the ray of light 28 to produce the aesthetically pleasing light pattern 20. It is likewise understood that the image 68 can be tailored to result in a particular or desirable light pattern 20.

As is indicated generally in FIG. 1, with the spectral dispersion device 4 oriented as indicated therein, the observer 24 looks slightly downwardly from a point vertically above the image surface 36 of the transmission member 8 to observe the light pattern 20. The configuration of the transmission member 8 beneficially results in the light pattern 20 appearing in the form of the optical illusion 25, whereby the light pattern 20 appears to be disposed beneath the transmission member 8 and spaced rearward of the dispersion surface 48 by at least the length 58 of the connection surface 44. The aforementioned optical illusion 25 results at least in part from the refraction of the ray of light 28 as it passes through the dispersion surface 48 and is spectrally dispersed as is indicated generally by the arrows 80 in FIG. 4.

In this regard, it can be seen that the observer 24 views different colors of the light pattern 20 at different positions with respect to the dispersion surface 48. As such, the observer 24 can observe changes in the light pattern 20 and flickering of various colors in various regions of the light pattern 20 by moving vertically and horizontally with respect to the dispersion surface 48 and by varying the distance between the observer 24 and the dispersion surface 48. The observer 24 thus looks generally in the direction of the dispersion surface 48 as one might observe the viewing lens of a telescope, with the light pattern 20 appearing as an optical illusion 25 emanating from below the transmission member 8 and spaced from the dispersion surface 48, and flickering and varying with movement of the observer 24 relative to the dispersion surface 48. In this regard, it is understood that with the optical illusion 25, the light pattern 20 appears to be produced from areas other than the interior 30 of the transmission member 8.

The spectral dispersion device 4 is depicted in FIG. 1 as being supported on the floor 26 with the light source 16 mounted on and projecting the ray of light 28 downwardly from the ceiling 27. It is understood that other orientations are possible for the light source 16 and the transmission member 8 without departing from the concept of the present invention.

The light source 16 can be any of a wide variety of devices that can produce the ray of light 28. For instance, the light source 16 may be a full-spectrum lamp that produces light in substantially all of the visible light wavelengths. Alternatively, the light source 16 may be a lamp that produces fewer than all of the visible light wavelengths. Still alternatively, the light source 16 may be sunlight or other light source. The selection of the light source 16 can be based upon numerous aesthetic and functional factors.

The transmission member 8 can alternatively be manufactured by augmenting the primary material with a secondary material that affects the transmissive qualities of the primary material as to at least one wavelength of light. The secondary material may be in the nature of a coating applied to the exterior 32 of the transmission member 8 or may be in the form of a dopant that is combined with the primary material to become mixed with or dispersed in the primary material. Examples of such secondary materials include numerous metal oxides that can be used as dopants to absorb, scatter, or otherwise affect the transmissive qualities of the primary material as to at least one wavelength of light.

The secondary material can be combined or otherwise interacted with the primary material to affect the light spectra that make up the light pattern 20. By interacting the secondary material with the primary material, the light spectra of the light pattern 20 emanating from the transmission member 8 can be fine-tuned to produce desirable wavelengths of light and to eliminate undesirable wavelengths of light to result in the aesthetically pleasing light pattern 20. In this regard, for aesthetic reasons it may be desired that the light pattern 20 be composed of the "softer" light wavelengths, particularly the reds, oranges, and yellows. Alternatively, it may be desirable for the light pattern 20 to be primarily composed of the "colder" light spectra including blues, greens, and violets. It thus can be seen that a desired light pattern 20 can be achieved by desirably configuring the image 68, providing the light source 16 to provide generally the range of light wavelengths that are desired in the light pattern 20, and by applying one or more secondary materials to the primary material of the transmission member 8 to disperse, absorb, or otherwise remove any undesirable wavelengths of light that are preferably eliminated from the light pattern 20.

It is further understood that by selecting a primary material having a desirable index of refraction, and by configuring the transmission member 8 to have a particular configuration in conjunction with the selected index of refraction, an aesthetically pleasing light pattern 20 can be produced. As indicated hereinbefore, the light pattern 20 appears according to the optical illusion 25, and varies with the position of the observer 24 with respect to the dispersion surface 48. Depending upon the desired light pattern 20, the spectral dispersion device 4 can be manufactured relatively inexpensively.

Figure 6:
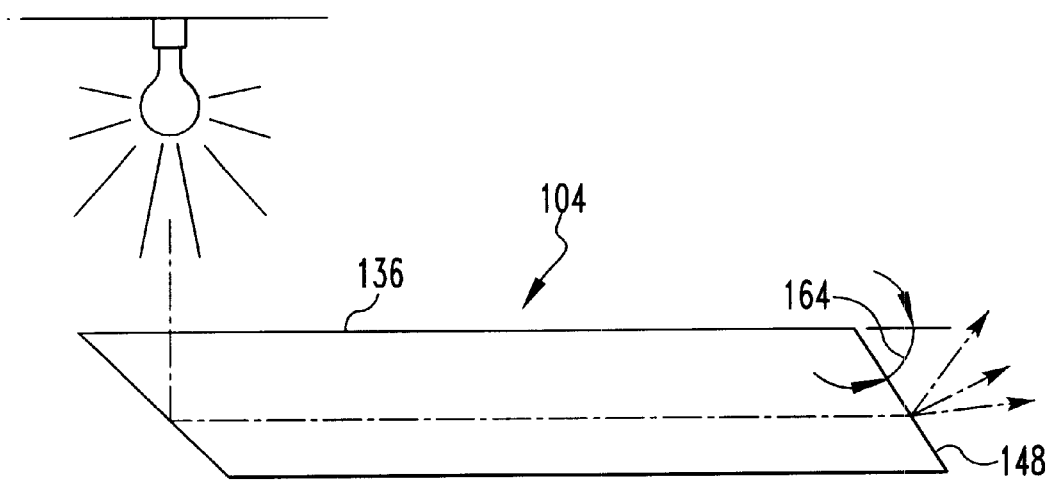
FIG. 6 is a side elevational view of a transmission member of a second embodiment of a spectral dispersion device in accordance with the present invention.

A second embodiment of a spectral dispersion device 104 in accordance with the present invention is indicated generally in FIG. 6. The spectral dispersion device 104 is similar to the spectral dispersion device 4, except that the spectral dispersion device 104 includes a dispersion surface 148 that is oriented differently with respect to the image surface 136. More specifically, the dispersion angle 164 of the spectral dispersion device 104 is measured with respect to a plane extending parallel with the image surface 136. As such, while the dispersion angle 164 is preferably between about 50 and 60 degrees, the dispersion angle 164 is a non-included angle with respect to the image surface 136. The spectral dispersion device 104 can be configured to provide desirable light patterns similar to those produced by the spectral dispersion device 4.

Figure 7:
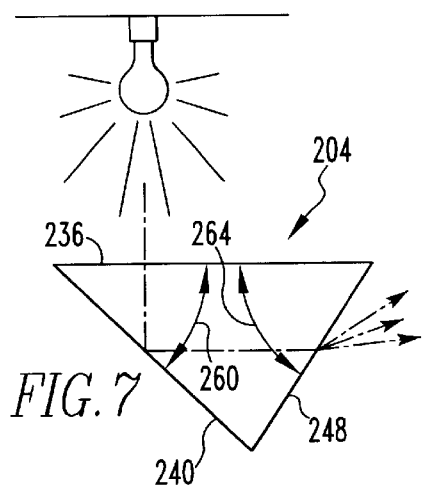
FIG. 7 is a side elevational view of a transmission member of a third embodiment of a spectral dispersion device in accordance with the present invention.

A third embodiment of a spectral dispersion device 204 in accordance with the present invention is indicated generally in FIG. 7. The spectral dispersion device 204 is similar to the spectral dispersion device 4, except the spectral dispersion device 204 does not include the connection surface 44. Rather, the spectral dispersion device 204 includes an image surface 236, a reflection surface 240, and a dispersion surface 248 that are connected with one another to be of a substantially triangular cross section from the perspective of a plane extending parallel with the page of FIG. 7. The reflection angle 260 and dispersion angle 264 are included angles between the image surface 236 and the reflection surface 240 and dispersion surface 248, respectively. The dispersion angle 264 can be the same as that disclosed hereinbefore if the primary material is the leaded glass formulation set forth above. The spectral dispersion device 204 produces a light pattern similar to that produced by the spectral dispersion device 4, except that the spectral dispersion device 204 does not produce the optical illusion inasmuch as it does not include a connection surface that spaces the reflection surface 240 from the dispersion surface 248.

Figure 8:
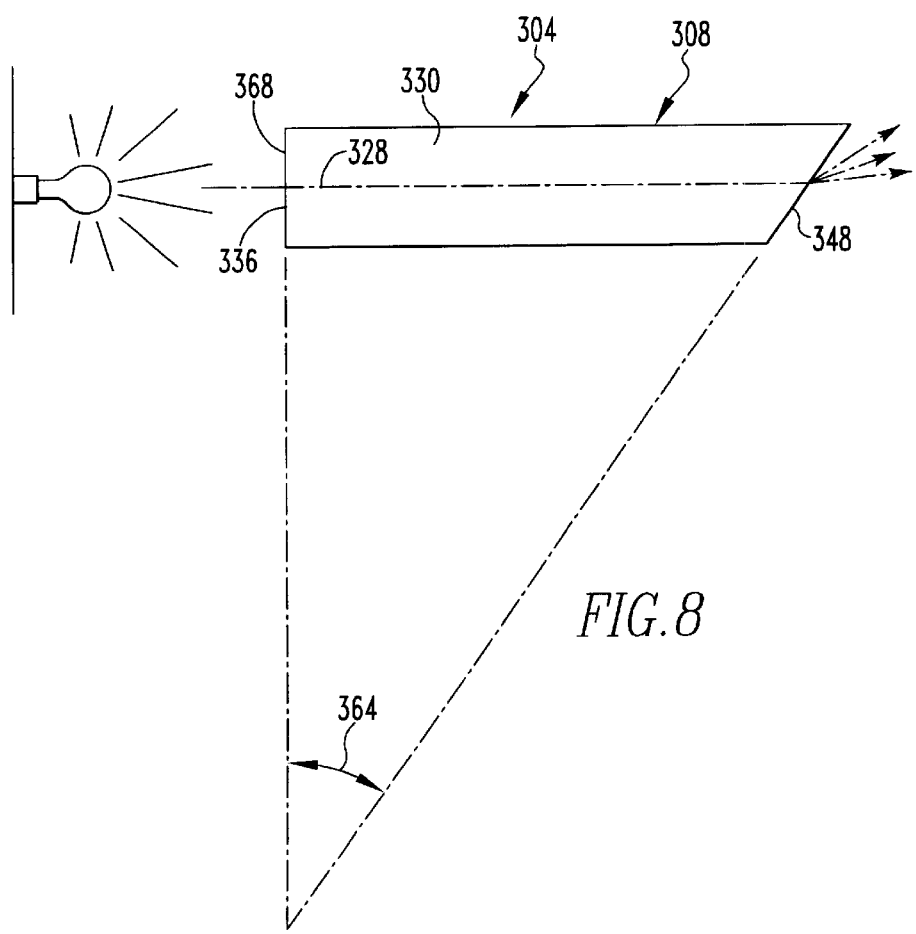
FIG. 8 is a side elevational view of a transmission member of a fourth embodiment of a spectral dispersion device in accordance with the present invention.

A fourth embodiment of a spectral dispersion device 304 in accordance with the present invention is indicated generally in FIG. 8. The spectral dispersion device 304 is similar to the spectral dispersion device 4, except that the spectral dispersion device 304 does not include the reflection surface 40. Rather, the spectral dispersion device 304 includes a transmission member 308 that is formed with an image surface 336 including an image 368 thereon whereby the ray of light 328 is transmitted directly through the image 368 and passes into the interior 330 of the transmission member 308 without being reflected within the interior 330. The ray of light 328 is transmitted directly through the interior 330 of the transmission member 308 and passes through the dispersion surface 348 where it is dispersed to form a light pattern similar to the light pattern 20. Inasmuch as the transmission member 308 does not employ reflection, the dispersion angle 364 can be the complement of the dispersion angle set forth hereinbefore if the primary material of the transmission member 308 is leaded glass. The term "complement" refers to the angle which, when combined with a given angle, will equal 90 degrees. As such, if the applicable dispersion angle is about 55 degrees, the complement thereof will be about 35 degrees. As such, the dispersion angle 364 will be the complement of whatever dispersion angle would ordinarily be appropriate and desirable for the spectral dispersion device 4.

What is claimed is:

1. A spectral dispersion device comprising:

a transmission member having an interior and an exterior, an image surface, a reflection surface, and a dispersion surface;

the interior being translucent to a ray of light having at least two different wavelengths;

the image surface including an image;

the reflection surface being oriented at a reflection angle with respect to the image surface;

the dispersion surface being oriented at a dispersion angle with respect to the image surface; and the transmission member being structured to receive the ray of light through the image surface and allow it to pass into the interior of the transmission member, reflect the ray of light off the reflection surface within the interior, and disperse the ray of light through the dispersion surface from the interior of the transmission member to the exterior thereof to display a light pattern in the form of a spectrally-dispersed representation of the image that is visible from the exterior.

2. The spectral dispersion device as set forth in claim 1, in which the image is transmissible by the ray of light.

3. The spectral dispersion device as set forth in claim 1, in which the image is formed on the image surface.

4. The spectral dispersion device as set forth in claim 3, in which the image surface includes an image region and a background region, the image region being relatively more transmissible by the ray of light than the background region.

5. The spectral dispersion device as set forth in claim 4, in which the background region is formed by etching the image surface.

6. The spectral dispersion device as set forth in claim 5, in which the background region is etched to a greater degree than the image region.

7. The spectral dispersion device as set forth in claim 1, further comprising a display stand, the transmission member being mounted to the display stand, the display stand being structured to support the transmission member at a given elevation with respect to a floor to permit the spectrally-dispersed representation of the image to be viewed by an observer.

8. The spectral dispersion device as set forth in claim 1, further comprising a light source that produces and transmits the ray of light toward the image surface.

9. The spectral dispersion device as set forth in claim 8, in which the light source is a full-spectrum lamp that produces light including substantially all of the visible light wavelengths.

10. The spectral dispersion device as set forth in claim 8, in which the light source is a lamp that produces light including fewer than all of the visible light wavelengths.

11. The spectral dispersion device as set forth in claim 1, in which the transmission member is formed of a primary material that is translucent to light of at least two different wavelengths and a secondary material that affects the transmissive qualities of the primary material as to at least one wavelength of light.

12. The spectral dispersion device as set forth in claim 11, in which the secondary material is a dopant combined with the primary material.

13. The spectral dispersion device as set forth in claim 1, in which the transmission member is at least partially formed of glass.

14. The spectral dispersion device as set forth in claim 1, in which the transmission member is at least partially formed of quartz.

15. The spectral dispersion device as set forth in claim 1, in which the image surface, reflection surface, and dispersion surface are connected with one another such that the transmission member is substantially triangular in cross section along a plane extending through the image surface, reflection surface, and dispersion surface.

16. The spectral dispersion device as set forth in claim 1, in which the reflection angle is about 45 degrees.

17. The spectral dispersion device as set forth in claim 1, in which the dispersion angle is between about 50 and 60 degrees.

18. The spectral dispersion device as set forth in claim 1, in which the dispersion angle is an included angle of about 55 degrees with respect to the image surface.

19. The spectral dispersion device as set forth in claim 1, in which the transmission member is structured to display an optical illusion of the light pattern emanating from other than the interior of the transmission member.

20. The spectral dispersion device as set forth in claim 1, in which the reflection surface and the dispersion surface are separated by a connection surface extending between the reflection surface and the dispersion surface.

21. The spectral dispersion device as set forth in claim 20, in which the image surface and the connection surface are substantially parallel with one another.

22. The spectral dispersion device as set forth in claim 21, in which the transmission member has a substantially trapezoidal cross-section through a plane extending through the image surface, reflection surface, connection surface, and dispersion surface.

23. The spectral dispersion device as set forth in claim 20, in which the transmission member is structured to display an optical illusion of the light pattern emanating from other than the interior of the transmission member and being spaced from the dispersion surface by at least the length of the connection surface.

24. The spectral dispersion device as set forth in claim 1, in which the transmission member is one of a single piece and a multiple-piece configuration.

25. A spectral dispersion device comprising:
   a transmission member having an interior and an exterior, an image surface, a reflection surface, and a dispersion surface;
   a light source structured to produce a ray of visible light;
   the interior being translucent to the ray of visible light;
   the image surface including an image;
   the reflection surface being oriented at a reflection angle with respect to the image surface;
   the dispersion surface being oriented at a dispersion angle with respect to the image surface; and
   the transmission member being structured to receive the ray of visible light through the image surface and allow it to pass into the interior of the transmission member, reflect the ray of visible light off the reflection surface within the interior, and spectrally disperse the ray of visible light through the dispersion surface from the interior of the transmission member to the exterior thereof to display a light pattern in the form of a spectrally-dispersed representation of the image that is visible from the exterior.

26. The spectral dispersion device as set forth in claim 25, in which the ray of visible light is transmissible through the image.

27. The spectral dispersion device as set forth in claim 25, in which the image is formed on the image surface.

28. The spectral dispersion device as set forth in claim 27, in which the image is at least partially formed by etching the image surface.

29. The spectral dispersion device as set forth in claim 25, further comprising a display stand, the transmission member being mounted to the display stand, the display stand being structured to support the transmission member at a given elevation with respect to a floor to permit the spectrally-dispersed representation of the image to be viewed by an observer.

30. The spectral dispersion device as set forth in claim 25, in which the light source is a full-spectum lamp that produces light including substantially all of the visible light wavelengths.

31. The spectral dispersion device as set forth in claim 25, in which the transmission member is formed of a primary material that is translucent to light of at least two different wavelengths and a secondary material that affects the transmissive qualities of the primary material as to at least one wavelength of light.

32. The spectral dispersion device as set forth in claim 30, in which the secondary material is a dopant combined with the primary material.

33. The spectral dispersion device as set forth in claim 25, in which the transmission member is at least partially formed of glass.

34. The spectral dispersion device as set forth in claim 25, in which the transmission member is at least partially formed of leaded glass.

35. The spectral dispersion device as set forth in claim 25, in which the image surface, reflection surface, and dispersion surface are connected with one another such that the transmission member is substantially triangular in cross section along a plane extending through the image surface, reflection surface, and dispersion surface.

36. The spectral dispersion device as set forth in claim 25, in which the reflection angle is about 45 degrees.

37. The spectral dispersion device as set forth in claim 25, in which the dispersion angle is between about 50 and 60 degrees.

38. The spectral dispersion device as set forth in claim 25, in which the dispersion angle is an included angle of about 55 degrees with respect to the image surface.

39. The spectral dispersion device as set forth in claim 25, in which the light pattern is in the form of an optical illusion emanating from other than the interior of the transmission member.

40. The spectral dispersion device as set forth in claim 25, in which the reflection surface and the dispersion surface are separated by a connection surface extending between the reflection surface and the dispersion surface.

41. The spectral dispersion device as set forth in claim 40, in which the image surface and the connection surface are substantially parallel with one another.

42. The spectral dispersion device as set forth in claim 40 in which the light pattern is in the form of an optical illusion emanating from other than the interior of the transmission member and being spaced from the dispersion surface by at least the length of the connection surface.

* * * * *